US009863795B2

(12) United States Patent
Autio et al.

(10) Patent No.: US 9,863,795 B2
(45) Date of Patent: Jan. 9, 2018

(54) PROCESS CALIBRATOR, METHOD FOR CONTROLLING A PROCESS CALIBRATOR AND USER INTERFACE FOR A PROCESS CALIBRATOR (71) Applicant: Beamex OY AB, Pietarsaari (FI)

(72) Inventors: Kari Autio, Pietarsaari (FI); Heikki Laurila, Pietarsaari (FI); Marko Stenbacka, Pietarsaari (FI)

(73) Assignee: BEAMEX OY AB, Pietarsaari (FI)

( * ) Notice: Subject to any disclaimer, the term of this patent is extended or adjusted under 35 U.S.C. 154(b) by 763 days.

(21) Appl. No.: 14/375,611

(22) PCT Filed: Feb. 8, 2013

(86) PCT No.: PCT/FI2013/050140
§ 371 (c)(1),
(2) Date: Jul. 30, 2014

(87) PCT Pub. No.: WO2013/117819
PCT Pub. Date: Aug. 15, 2013

(65) Prior Publication Data
US 2015/0039257 A1  Feb. 5, 2015

(30) Foreign Application Priority Data

Feb. 8, 2012  (FI) .................................... 20125138

(51) Int. Cl.
*G01C 19/00* (2013.01)
*G01C 25/00* (2006.01)
(Continued)

(52) U.S. Cl.
CPC ............. *G01D 18/00* (2013.01); *G05B 15/02* (2013.01); *G05B 19/0425* (2013.01);
(Continued)

(58) Field of Classification Search
CPC .. G06F 3/0482; G06F 3/0416; G06F 3/04883; G06F 3/044; G06F 19/322;
(Continued)

(56) References Cited

U.S. PATENT DOCUMENTS 4,907,085 A   3/1990  Bingham
6,947,389 B1  9/2005  Chen et al.
(Continued)

FOREIGN PATENT DOCUMENTS

EP   1970889      9/2008
EP   2166364      3/2010
WO   2009/096917  8/2009

OTHER PUBLICATIONS

Supplementary European Search Report for Application No. 13747138.9, dated Dec. 9, 2015.
(Continued)

*Primary Examiner* — Roy Y Yi
(74) *Attorney, Agent, or Firm* — Andrus Intellectual Property Law, LLP (57) ABSTRACT A process calibrator is formed with a user interface, which guides to choose the right connection arrangements of the process calibrator according to the function of the process calibrator. The user interface shows in the display of the process calibrator the connection arrangements of the process calibrator and indicates the place of the connection arrangement assigned to the selected function visually compared to other connection arrangements. The connection arrangements shown by the user interface in the display are placed similarly to the physical connection arrangements of the process calibrator. As the user interface indicates the connection arrangement that is assigned to the selected function of the process calibrator, it is easy for the user to make the right connection.

20 Claims, 6 Drawing Sheets (51) Int. Cl.
*G01D 18/00* (2006.01)
*G01F 25/00* (2006.01)
*G06F 19/00* (2011.01)
*G05B 15/02* (2006.01)
*G06F 3/0484* (2013.01)
*G06F 3/0488* (2013.01)
*G05B 19/042* (2006.01)
*G05B 19/05* (2006.01)

(52) U.S. Cl.
CPC ......... *G05B 19/054* (2013.01); *G06F 3/0488* (2013.01); *G06F 3/04842* (2013.01); *G05B 2219/1134* (2013.01); *G05B 2219/13144* (2013.01); *G05B 2219/23043* (2013.01); *G05B 2219/23406* (2013.01); *G05B 2219/25428* (2013.01); *G05B 2219/31046* (2013.01); *G05B 2219/31121* (2013.01); *G05B 2219/31181* (2013.01); *G05B 2219/32128* (2013.01); *G05B 2219/33331* (2013.01); *G05B 2219/36136* (2013.01); *Y02P 90/04* (2015.11)

(58) Field of Classification Search
CPC . G06F 2203/04103; G06F 2203/04112; G06F 3/0412; G06F 3/0481; G06F 3/04842; G06F 3/04845; G06F 11/0709; G06F 11/0751
See application file for complete search history.

(56) References Cited

U.S. PATENT DOCUMENTS

| | | |
|---|---|---|
| 2002/0063730 A1 | 5/2002 | Lee |
| 2003/0060908 A1 | 3/2003 | Moehler et al. |
| 2005/0076144 A1* | 4/2005 | Boylan ............ H04L 29/12283 709/245 |
| 2006/0212809 A1 | 9/2006 | Oshima |
| 2008/0091376 A1 | 4/2008 | Russell et al. |
| 2008/0225038 A1 | 9/2008 | Jeong |
| 2008/0320395 A1 | 12/2008 | Yuasa |
| 2011/0131520 A1* | 6/2011 | Al-Shaykh .......... H04L 12/2807 715/772 |

OTHER PUBLICATIONS

Finnish Search Report for Finnish Application No. 20125138 dated Oct. 1, 2012.
International Preliminary Report on Patentability for PCT/FI2013/050140 dated Jun. 13, 2014.
International Search Report and Written Opinion for PCT/FI2013/050140 dated Jun. 6, 2013.
Response to Written Opinion for PCT/FI2013/050140 dated Dec. 9, 2013.
Written Opinion for PCT/FI2013/050140 dated May 9, 2014.
Response to Written Opinion for PCT/FI2013/050140 dated Jun. 9, 2014.

* cited by examiner

PROCESS CALIBRATOR, METHOD FOR CONTROLLING A PROCESS CALIBRATOR AND USER INTERFACE FOR A PROCESS CALIBRATOR

CROSS-REFERENCE TO RELATED APPLICATIONS

This application is the U.S. national stage application of International Application PCT/FI2013/050140, filed Feb. 8, 2013, which international application was published on Aug. 15, 2013, as International Publication WO2013/117819 in the English language. The international application is incorporated herein by reference, in entirety. The international application claims priority to Finnish Patent Application No. 20125138, which is incorporated herein by reference.

The invention relates to a process calibrator with a memory, a processor, a display, which is arranged to show the user interface, and at least two functions and at least two connection arrangements, which are assigned to different functions of the process calibrator. The invention further relates to a method for controlling a process calibrator and a user interface for a process calibrator.

PRIOR ART

In industry, the same process and phase may include several process instruments. These are devices or converters that measure a variable and convert the measured value into another, usually electronic, form. An example of such is a pressure transducer which measures pressure and converts the measured value into one of the following forms: pressure, current signal, voltage signal, display, digital signal or something else. Also different controllers related to the process are process instruments.

Devices related to the process may be connected via a fieldbus. By a fieldbus such a usually digital communications solution is meant, whereby several fieldbus instruments are joined in the same fieldbus segment. A fieldbus instrument is a process instrument, which measures continuously a variable and converts the measured value continuously into a form according to the fieldbus protocol. An example thereof is a pressure transducer. If a pressure of 1,0000 bar is connected to its input, the output according to the fieldbus protocol of the sender needs to tell, that the input is 1,0000 bar.

Fieldbus instruments may include for example frequency converters, switches, valves and measuring devices. The basic idea in a fieldbus is digital data transmission, by which information can be exchanged bidirectionally between the control system of the process and the fieldbus instruments. Processes are measured and controlled and they can be automated by means of a fieldbus. Advantages in use of fieldbuses are for example decreasing of wiring and connections, bidirectional data transmission and decreasing of maintenance costs. On the other hand, fieldbuses require special skills and management of large entireties from their operator. There are several different standards of fieldbuses, and they use their own fieldbus protocols respectively. A fieldbus communicator is used to communicate with the fieldbus instruments of a fieldbus. Therewith for example different settings of fieldbus instruments can be checked and changed. The fieldbus communicator has to support the fieldbus protocol of the used fieldbus. Generally a fieldbus communicator is manufactured to support one fieldbus protocol. Publication U.S. Pat. No. 7,117,122 discloses a device with features of a fieldbus communicator for diagnosis of a fieldbus. The device can be operated with two different fieldbus protocols by changing terminals.

Usually, process instruments need to be calibrated or checked regularly for proper operation and proper and accurate conversion of signal. Thereby an accurate signal of correct variable is fed into the input, and at the output of the device the signal is read which is indicated by the transmitter as the input. By comparing these two it can be confirmed whether the transmitter is working correctly, that is whether it converts the output into input in a correct way. For that reason process calibrators are used that are measuring devices that are accurate enough, so that they can be used for calibrating process instruments. Usually, process calibrators support such variables that are used by the most typical process instruments, that is, for example, pressure, voltage, current, temperature, frequency and the like. Generally, process calibrators comprise a user interface, by which the variable to be examined can be changed, i.e. the function of the process calibrator is changed. The process calibrator can, for example, be first chosen to perform a function, where a process instrument is being calibrated, which processes current, and thereafter it can be chosen to perform another function, where another process instrument is being calibrated, which processes frequency. Generally, for different types of functions there are different connection arrangements, which can include different connection terminals, sensors, connectors, different coupling arrangements and similar. Some connection arrangements may support several functions. For example, the same connection terminals may be related to the functions of voltage and frequency. Since the process calibrators are designed to be of multipurpose type, there can, however, be a considerable amount of connection arrangements.

Calibration may include adjusting of the process instrument, but it is not necessarily required. It is essential to find out how the process instrument changes the known signal.

From patent publication U.S. Pat. No. 6,571,188 is known a process calibrator of prior art described above. Here, a known process signal is fed to the process instrument and the result is saved in the memory of the calibrator. Hereby is shown a graphic user interface of the process calibrator, where it can be seen, which variable is being processed. It is emphasized in the publication, how the user interface, known by the user, is used, which makes the use of the process calibrator easier.

Process calibrators are complicated devices that require training and expertise from their user. Incorrect use of the process calibrator, either due to incompetence or human error, may cause great damages due to standstill of the process or getting into an error condition. Improvements in the convenience of use and clarity of the process calibrator are of essential importance, since with them faults can be avoided.

SUMMARY

The object of the invention is a solution, by which the disadvantages and drawbacks of the prior art can be diminished. Especially, the object of the invention is a solution, by means of which the use of a process calibrator can be facilitated and simplified.

The objects according to the invention are achieved with a process calibrator, a method for controlling the use of a process calibrator, and with a user interface of a process calibrator, characterized in what is disclosed in the independent claims. Some preferred embodiments of the invention are disclosed in the dependent claims.

The main idea of the invention is to form a process calibrator with a user interface, which guides to choose the right connection arrangements of the process calibrator according to the function of the process calibrator. The user interface shows in the display of the process calibrator a visual presentation with the connection arrangements or at least a part of it, and indicates in this visual presentation the place of the connection arrangement assigned to the chosen function visually compared to other connection arrangements. The connection arrangements shown by the user interface in the display are placed similarly to the physical connection arrangements of the process calibrator. As the user interface indicates the connection arrangement that is assigned to the chosen function of the process calibrator, it is easy for the user to make the right connection.

A process calibrator according to an embodiment of the invention comprises a memory, a processor, a display which is arranged to show the user interface, and at least two functions and at least two connection arrangements, which are assigned to different functions of the process calibrator. According to a preferred embodiment of the invention, said user interface is arranged to show different selective functions of the process calibrator in the display. In connection with the selected function the user interface is arranged to show in the display the place of the connection arrangement assigned to the function, visually highlighted compared to other connection arrangements. The visual highlighting may be for example changing the colour or contrast of the place of the connection arrangement assigned to the selected function, marking the place of the connection arrangement with a form, an image or indicator or changing the image size of the connection arrangement compared to other connection arrangements. The highlighting may also be an animation. It is essential, that the user is able to distinguish between the connection arrangement assigned to the selected function and other connection arrangements shown in the display. The visual presentation is proportional to the location of the connection arrangements in the process calibrator, i.e. in the visual presentation the places of the connection arrangements are proportional to the location of the connection arrangements in the process calibrator. The visual presentation is thus arranged to show at least a part of the connection arrangements of the process calibrator in the display. The visual presentation may also include markings, such as for example text or similar marks which facilitate the identification and selection of the connection arrangement in the process calibrator.

In an embodiment of the process calibrator according to the invention the display is a touch screen.

In another embodiment of the process calibrator according to the invention, a connection instruction is related to the place of the connection arrangement shown by the user interface. In a third embodiment of the process calibrator according to the invention, at least a part of the connection arrangements comprise two connecting points, and the connection instruction indicates the connection thereof. In a fourth embodiment of the process calibrator according to the invention, one of the two connecting points is a ground connection. That is, thereby the user interface shows in which way the connection is to be made.

In a fifth embodiment of the process calibrator according to the invention, at least a part of the functions comprises subfunctions, that can be selected by the user interface and that realize different alternatives of the functions. Subfunctions may include, for example, different measuring ranges, such as in current measurement the milliampere range or the microampere range.

In a sixth embodiment of the process calibrator according to the invention, the process calibrator comprises two or more higher operating modes, which can be selected by the user interface, and each higher operating mode includes one function or more. In a seventh embodiment of the process calibrator according to the invention, one higher operating mode is a fieldbus communicator or a fieldbus communicator is a function of one or more higher operating mode(s).

In an eighth embodiment of the process calibrator according to the invention, the process calibrator comprises at least one key for controlling the user interface.

In a ninth embodiment of the process calibrator according to the invention, the process calibrator can be arranged to perform simultaneously two or more functions, and the user interface is thereby arranged to show on the touch screen the places of the connection arrangements assigned to the selected functions.

In a tenth embodiment of the process calibrator according to the invention, said connection arrangements are substantially on the same side of the process calibrator as said display. This means, that the connection arrangements represented in the visual presentation are achievable in operation of the process calibrator without need to turn over the process calibrator. Thereby said connection arrangements are located on the front surface of the process calibrator, where the display is located, or on the sides thereof. The visual presentation indicates the location of the process calibrator on different sides.

In a method according to an embodiment of the invention, for controlling of the process calibrator the process calibrator comprises a memory, a processor, a display which is arranged to show the user interface, and at least two functions and at least two connection arrangements, which are assigned to different functions of the process calibrator. According to a preferred embodiment of the invention, the method comprises steps, in which said user interface shows different selective functions of the process calibrator in the display. In connection with the selected function the user interface shows in the display the place of the connection arrangement assigned to the function, visually highlighted compared to other connection arrangements. In said visual presentation shown in the display, the places of the connection arrangements are proportional to the location of the connection arrangements in the process calibrator.

In an embodiment of the method according to the invention the display is a touch screen.

In another embodiment of the method according to the invention, the user interface represents the connection instruction related to the place of the connection arrangement. In a third embodiment of the method according to the invention, at least in a part of the connection arrangements there are two connection points, and the connection instruction includes an indication of how the connection points are connected. In a fourth embodiment of the method according to the invention, the indication is represented visually.

In a fifth embodiment of the method according to the invention, at least part of the functions comprises subfunctions, that can be selected by the user interface and that realize different alternatives of the functions.

In a sixth embodiment of the method according to the invention, the process calibrator comprises two or more higher operating modes, which can be selected by the user interface, and each higher operating mode includes one function or more.

In a seventh embodiment of the method according to the invention, the process calibrator can be arranged to perform simultaneously two or more functions, and the user interface is thereby arranged to show on the touch screen the places of the connection arrangements assigned to the selected functions.

In a user interface of the process calibrator according to an embodiment of the invention, which process calibrator comprises a memory, a processor, a display which is arranged to show the user interface, and at least two functions and at least two connection arrangements, which relate to different functions of the process calibrator, the user interface is saved in a memory as a computer software product, which is run in the processor. According to a preferred embodiment of the invention, said user interface is arranged to show different selective functions of the process calibrator in the display. In connection with the selected function the user interface is arranged to show in the display a visual presentation where the place of the connection arrangement assigned to the function is visually highlighted compared to other connection arrangements. In said visual presentation shown in the display, the places of the connection arrangements are proportional to the location of the connection arrangements in the process calibrator.

In an embodiment of the user interface according to the invention the display is a touch screen.

An advantage of the invention is that by means of it the use of the process calibrator can be made easier.

An advantage of the invention is further, that it simplifies the use and selection of different modes of the process calibrator.

Further, an advantage of the invention is that it is applicable in different types of process calibrators. Further, the invention reduces misconnections, which improves safety.

An advantage of the invention is further that it enables combining of different additive properties to the process calibrator, which additive properties would otherwise make the use of the process calibrator complicated. One of such preferred additive properties is fieldbus communication.

DESCRIPTION OF THE FIGURES

In the following, the invention will be described in detail. In the description, reference is made to the enclosed drawings, in which.

DETAILED DESCRIPTION OF FIGURES

Figure 1:
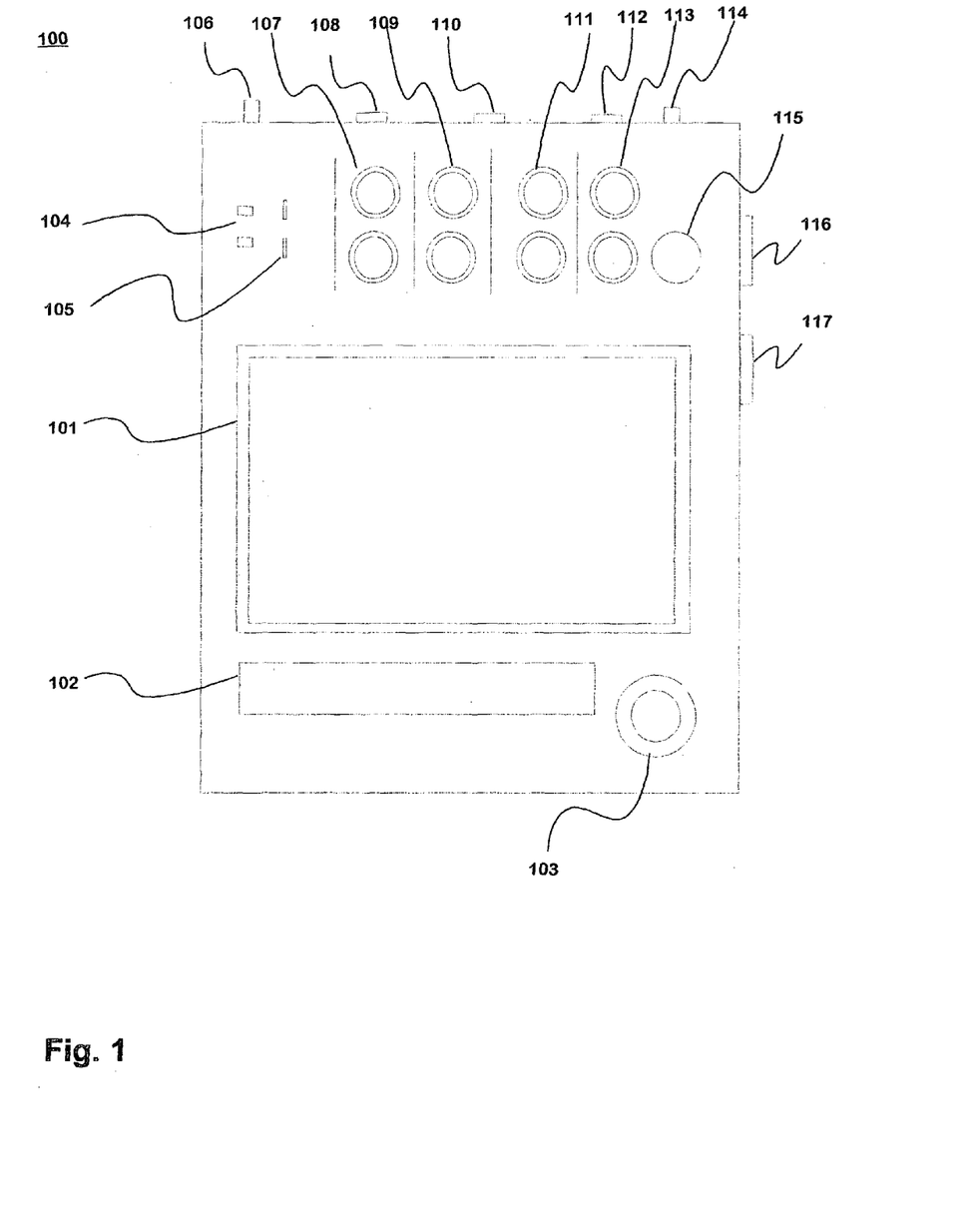
FIG. 1 shows by way of example a process calibrator according to the invention.

FIG. 1 shows by way of example a process calibrator 100 according to the invention. The process calibrator comprises a display 101, a keyboard 102 and a power switch 103. Further, the process calibrator comprises a plurality of connection arrangements, that are described later, and a USB connector 116 and a network connector 117 for connecting to external devices, for example for transmitting and storing information collected by the process calibrator. The user interface of the process calibrator is represented in display 101. The user interface can be controlled with the keyboard, or if the display is a touch screen, by touching the display at appropriate points, or as combination of the foregoing. The process calibrator can be switched off and on with the power switch. The process calibrator comprises a memory and a processor. The files and commands necessary for the use of the process calibrator are stored in the memory. These commands are executed in the processor for operating the process calibrator.

In the process calibrator shown in the example there are several different functions and higher operation modes which include several different functions. By means of the user interface one can move between the different higher operation modes and the different functions and choose the desired one of them.

Connection arrangements of a process calibrator include the first thermocouple connection arrangement 104, the second thermocouple connection arrangement 105, the first connection arrangement 106 for measuring the resistance and the RTD temperature sensor, the second connection arrangement 107, the first pressure connection arrangement 108, the third connection arrangement 109, the second pressure connection arrangement 110, the first multi-variable connection arrangement 111 for feeding the voltage, the current and the frequency to the process instrument to be calibrated, the third pressure connection arrangement 112, the second multi-variable connection arrangement 113 for reading the voltage, the current and the frequency, a connection arrangement of an external sensor 114, the third multi-variable connection arrangement 115. The first thermocouple connection arrangement 104 is meant for standard connectors, and the second thermocouple arrangement 105 for flat connectors. The second connection arrangement is for measuring the resistance. The connection arrangements may be individual connectors, such as pressure connection arrangements, or connector pairs, such as the second connection arrangement 107 and the third connection arrangement 109 and the first and the second multi-variable connection arrangement. In the first and the second multi-variable connection arrangement one of the connectors of the pair is a signal connector and the other one is a ground connector. In a case according to the example the upper one of the connectors of the pair is a signal connector and the lower one is a ground connector. The third multi-variable connection arrangement uses the ground connector of the second multi-variable connection arrangement as the ground connector. That is, there are situations where different connection arrangements share common connectors. For example, the third connection arrangement 109 may be combined with the second connection arrangement 107, whereby a four-terminal connection arrangement is formed, through which resistance or a RTD temperature sensor is measured with 2, 3 or 4 wires. Further, when switching the higher operation modes of the process calibrator the different connection arrangements may function in a different way.

Naturally, this is only one example of the connection arrangements and their location. There may be a different amount of connection arrangements, they may be related to processing of different variables or they may be placed in a different way. Preferably, the display and most of the connection arrangements are on the same side of the process calibrator, i.e. they are placed such that the user can simultaneously see both the display and most of the connection arrangements.

Figure 2:
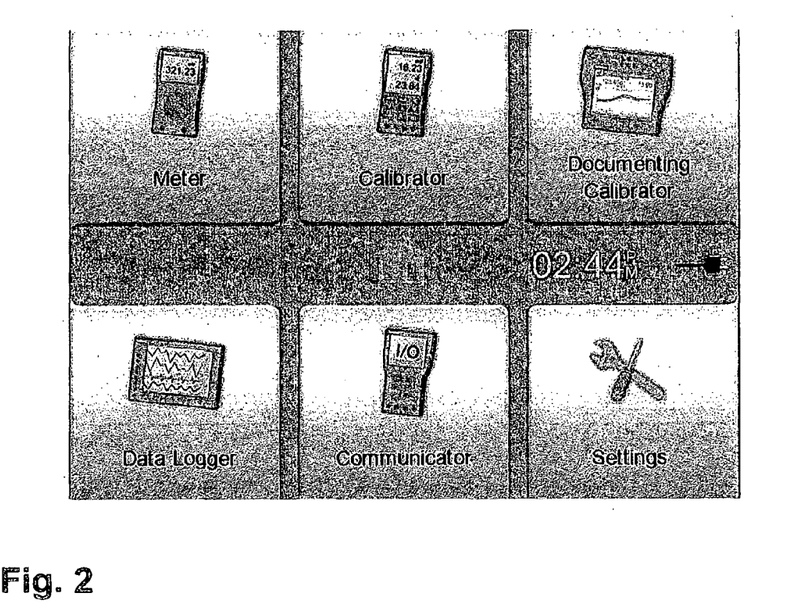
FIG. 2 shows by way of example a main menu represented in the display of the process calibrator according to the invention.

FIG. 2 shows an example of a main menu shown in the display of the process calibrator according to the invention, where one can choose from six different higher operation modes. The higher operation modes of the upper row from left to right are: measuring device, process calibrator and documenting process calibrator. The higher operation modes of the lower row from left to right are: data collector, fieldbus communicator and settings.

Figure 3:
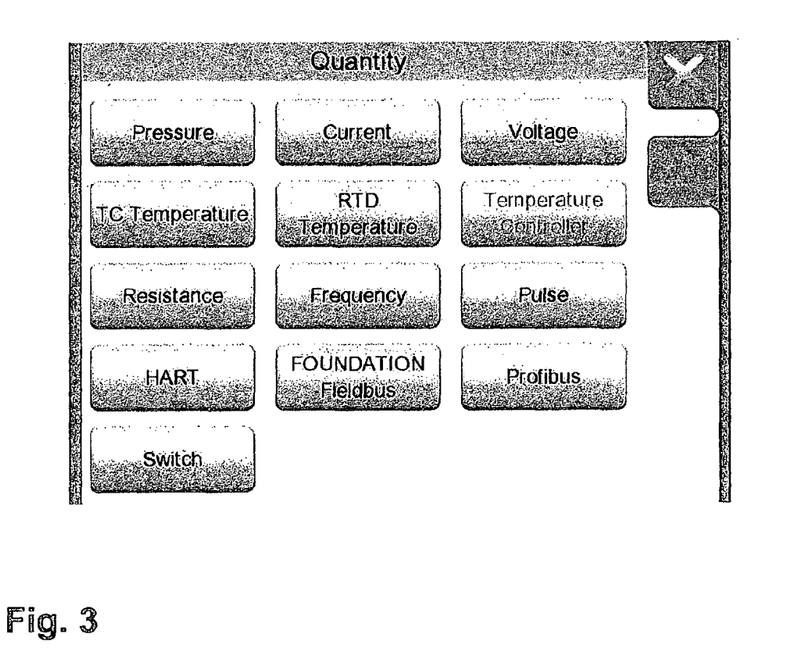
FIG. 3 shows by way of example the menu shown in the display of the process calibrator according to the invention, in which menu different functions of the process calibrator can be selected.

FIG. 3 shows an example of a submenu shown in the display of the process calibrator according to the invention, where one can select between different functions. The functions of the uppermost row from left to right are: pressure, current and voltage. The functions of the second row from left to right are: thermocouple temperature, RTD (resistive thermal device) and control of temperature. The functions of the third row from left to right are: resistance, frequency and pulse. The functions of the fourth row from left to right are: HART communication protocol, FOUNDATION Fieldbus communication protocol and Profibus communication protocol. The lowest row comprises measuring of the state of the switch, by which it can be checked whether the switch is open or closed. From the menu according to FIG. 3 one can select a function.

Figure 4:
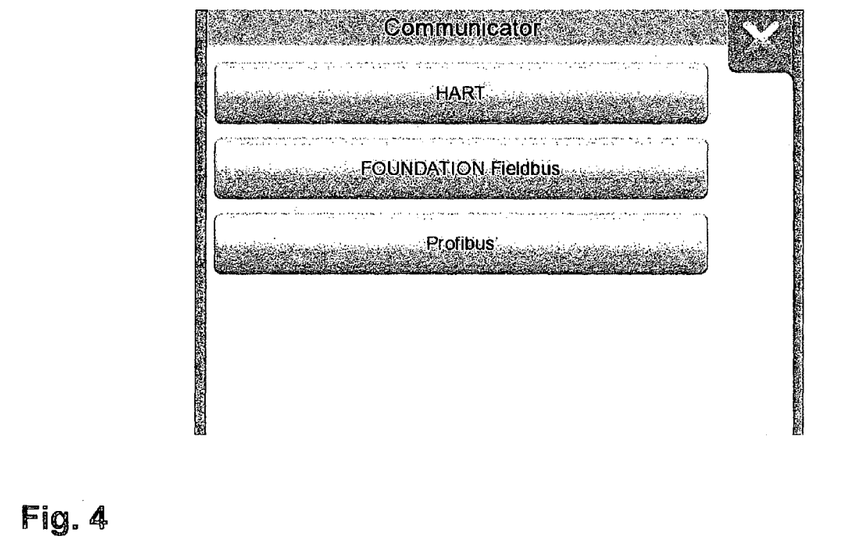
FIG. 4 shows by way of example the menu of a higher operation mode shown in the display of the process calibrator according to the invention, in which menu the fieldbus protocol to be used is selected.

FIG. 4 shows an example of a menu, which can be obtained, if the higher operation mode fieldbus communicator is selected in the main menu of FIG. 2. Thereby there's access to a menu according to FIG. 4, where one can select, which fieldbus protocol one wishes to use: HART, FOUNDATION Fieldbus or Profibus communication protocol.

Figure 5:
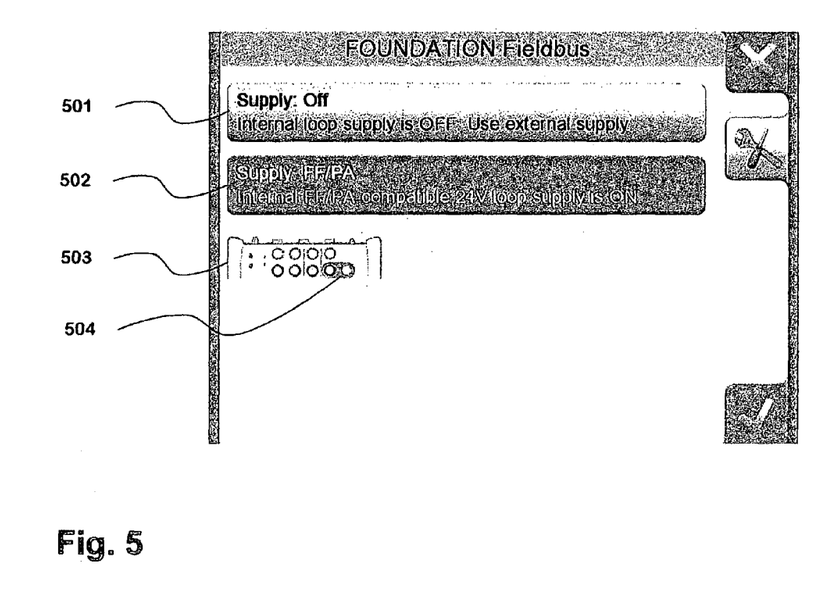
FIG. 5 shows by way of example the menu related to the FOUNDATION Fieldbus fieldbus protocol shown in the display of the process calibrator according to the invention, in which menu, as a result of the selection, the connection instruction is shown in the display of the process calibrator.

FIG. 5 shows an example of a menu that can be achieved, if FOUNDATION Fieldbus communication protocol is selected in menu of FIG. 4. Thereby two alternatives are achieved: upper selecting point 501, which is used if the inner voltage source is switched off, and the lower selecting point 502, which is used, if the internal voltage source of the process calibrator is switched on. In the example, the lower selecting point is selected. Thereby, the user interface of the process calibrator shows in display the visual instruction 503 for selecting and connecting the connection arrangement 504 assigned to the selected function. This visual instruction is a simplified image of the connection arrangements of the process calibrator or of at least part of them and of their relations to each other. It is essential, that the visual instruction shown in the display resembles the physical order of the connection arrangements of the process calibrator. The visual instruction may be an image, to which the highlighting of the connection arrangement assigned to the selected function is added, or image of the connection arrangements of each process calibrator, where the used connection arrangement is highlighted, may be an individual image. In some cases, the visual instruction may be a series of images or an animation. By means of an animation the connection sequence may be shown when necessary. The visual instruction may be of different types for different functions of the process calibrator. That is, the visual instruction is a visual presentation on a display, which is proportional to the physical location of the connection arrangements in a process calibrator. Preferably, the connection arrangements are placed in a process calibrator in a way, that the user of the process calibrator can see the visual instruction and the connection arrangements or at least their locations in the display. That is, the user sees the visual instruction and at least part of the connection arrangements of the process calibrator at the same time.

In the example of FIG. 5, the visual instruction 503 is shown below the selecting points, but there are also other solutions for placement of the visual instruction. It may, for example, be shown next to the selecting point. The connection arrangement 504 assigned to the selected function 502 is highlighted in the visual instruction. This highlighting may be realized for example with colours or by changing the contrast of the display in the visual instruction in a way that the connection arrangement 504 assigned to the function will become indicated. When comparing the visual instruction of FIG. 5 to the connection arrangements of FIG. 1, it can be seen, that the used connection arrangement 504 is formed of the third multi-variable connection arrangement 115 and the ground connector of the second multi-variable connection arrangement 113. Since it is of importance in regard to the voltage, whether the ground is connected correctly, the visual instruction can further indicate, how the connection is to be done, for example by highlighting the ground connector in indication of the connecting sequence.

Figure 6:
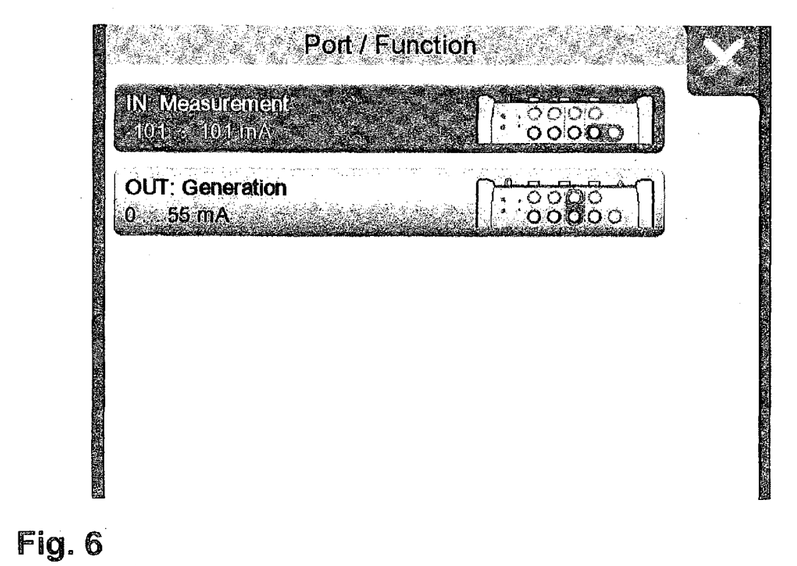
FIG. 6 shows by way of example the menu related to current processing shown in the display of the process calibrator according to the invention, in which menu, as a result of the selection, the connection instruction is shown in the display of the process calibrator.

FIG. 6 shows an example of a menu that can be achieved, if "current" is selected in the menu of FIG. 3. Thereby, there is access to the submenu, where it can be selected, whether the current is measured, whereby the upper selection point is selected, or whether current is produced, for example, for calibration, whereby the lower selection point is selected. If the current is measured, the user interface produces a visual instruction, where the connection arrangement assigned to the function is highlighted. In a case according to the example, the visual instruction highlights the connection arrangement, to which the connection arrangement corresponds in the process calibrator of FIG. 1, which connection arrangement is formed of the third multi-variable connection arrangement 115 and of the ground connector of the second multi-variable connection arrangement 113. If current is fed, the user interface produces a visual instruction, whereby the visual instruction highlights the connection arrangement, to which the first multi-variable connection arrangement 111 corresponds in the process calibrator of FIG. 1.

Figure 7:
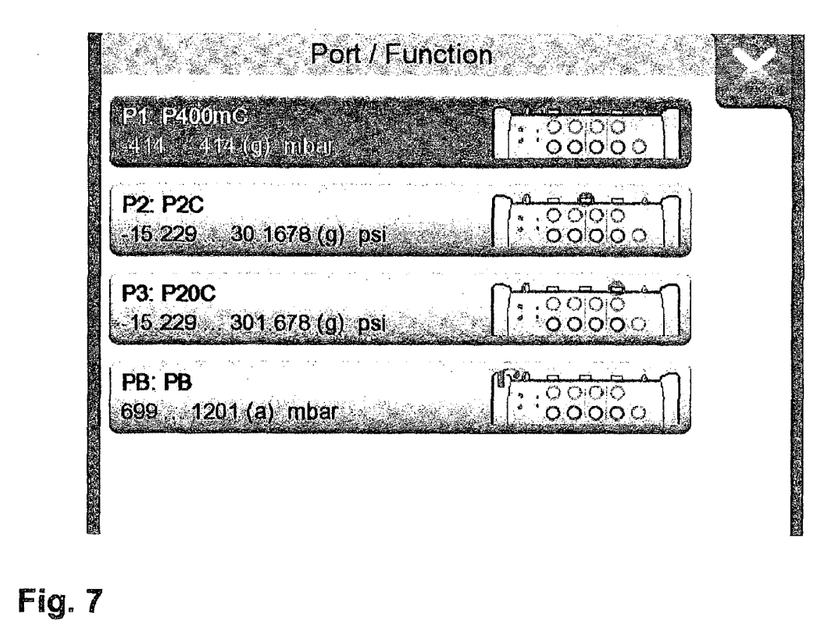
FIG. 7 shows by way of example the menu related to current processing shown in the display of the process calibrator according to the invention, in which menu, as a result of the selection, the connection instruction is shown in the display of the process calibrator.

In FIG. 7 an example is shown of a menu where several pressure measurements can be selected, that are different functions of the process calibrator. In the menu, there are four alternatives that can be selected. In the figure a visual instruction for each alternative is shown that indicates the connection arrangement related to the alternative. If the uppermost alternative is selected, the visual instruction highlights the connection arrangement, to which the first pressure connector 108 corresponds in the process calibrator of FIG. 1. If the alternative is selected that is the next one downwards, the visual instruction highlights the connection arrangement, to which the second pressure connector 110 corresponds in the process calibrator of FIG. 1. If the alternative is selected that is the next one downwards, that is, the next lowest, the visual instruction highlights the connection arrangement, to which the third pressure connector 112 corresponds in the process calibrator of FIG. 1. If the lowest alternative is selected, the visual instruction highlights the connection arrangement, to which the first connection arrangement 106 corresponds in the process calibrator of FIG. 1. In the example of this figure the connection arrangements to be indicated are on a different surface than the display, but their location can be indicated in the visual instruction. When required, the visual instruction may also show a different surface than on which surface the display is located.

Figure 8:
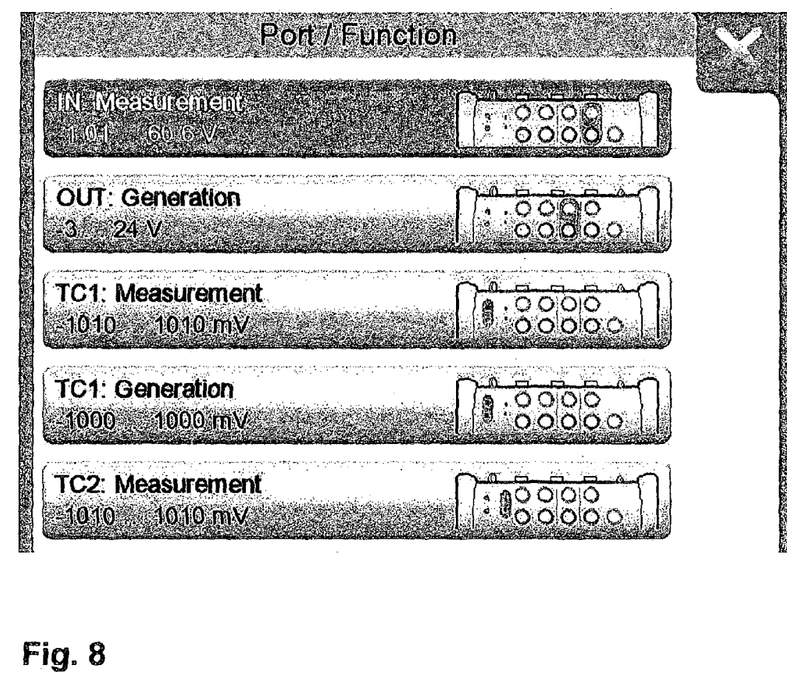
FIG. 8 shows by way of example the menu shown in the display of the process calibrator according to the invention, in which menu, as a result of the selection, the connection instruction is shown in the display of the process calibrator.

Similarly to FIG. 7, in FIG. 8 an example of a menu is shown, where different functions of the process calibrator can be selected. In two uppermost points of the menu the process calibrator processes voltage. In the uppermost alternative the process calibrator measures voltage. Thereby it is corresponded to by the highlighting of the visual instruction for the connection arrangement, to which the second multi-variable connection arrangement 113 corresponds in the process calibrator of FIG. 1. In the next alternative, the process calibrator feeds voltage. Thereby it is corresponded to by the highlighting of the visual instruction for the connection arrangement, to which the first multi-variable connection arrangement 111 corresponds in the process calibrator of FIG. 1. The three next alternatives are related to the processing of the thermocouple elements of the process calibrator. By selecting the next alternative of the alternatives of the figure the process calibrator may be arranged to measure the signal of the thermopair connector provided with the standard connector. Thereby it is corresponded to by the highlighting of the visual instruction for the connection arrangement, to which the first thermopair connection arrangement 111 corresponds in the process calibrator of FIG. 1. The next alternative downwards is selected when the process calibrator is desired to produce a similar signal to the thermopair element, for example, in connection with the calibration. Thereby it is corresponded to by the highlighting of the visual instruction for the connection arrangement, to which the first thermopair connection arrangement 104 corresponds in the process calibrator of FIG. 1. The lowest alternative is chosen, when the wire of the thermocouple element to be measured comprises a flat connector. Thereby it is corresponded to by the highlighting of the visual instruction for the connection arrangement, to which the second thermopair connection arrangement 105 corresponds in the process calibrator of FIG. 1.

The process calibrator may further comprise functions, where connectors are connected in more than one connection arrangement. Thereby the visual instruction of the user interface gives the corresponding connecting instruction. The process calibrator may also comprise functions, which do not include connecting of connection arrangements, such as for example, the internal functions of a process calibrator, such as adjustments or changing of the settings. A visual instruction is not assigned to this kind of function.

The visual instruction assigned to the function may be shown in connection with the selection fields or it may be arranged to appear only when the selection field is activated, i.e. the function is selected. It is substantial, that the visual instruction includes a clear indication of which connection arrangement is assigned to the function.

Figure 9:
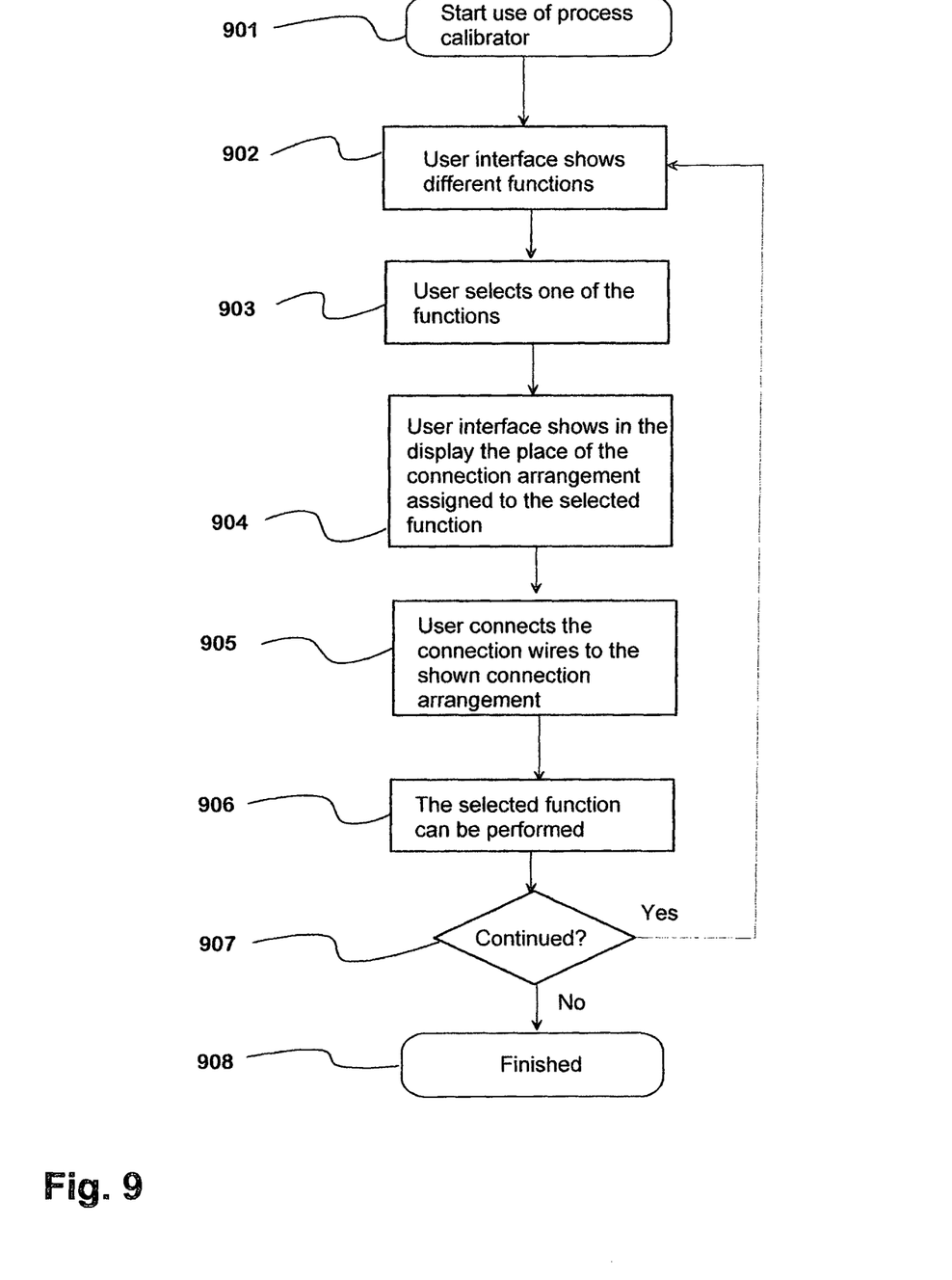
FIG. 9 shows by way of example a flow chart of the method according to the invention.

FIG. 9 shows by way of example a flow chart of the method according to the invention. Hereby the method is described step by step.

In step 901 the use of a process calibrator is started. Thereafter, in step 902, the user interface shows in the display of the process calibrator different functions that the process calibrator can perform. In step 903 the user selects one of these functions. The user interface shows in the display the place 904 of the connection arrangement assigned to the selected function. The user connects the connection wires to the connection arrangement 905 shown by the user interface, whereafter the selected function can be performed 906. Thereafter, it is chosen whether the use of the process calibrator is continued 907. The use is finished in step 908. If it is desired to continue the use, one returns to step 902.

Above some preferred embodiments according to the invention have been described. The invention is not limited to the solutions described above, but the inventive idea can be applied in numerous ways within the scope of the claims.

The invention claimed is:

1. A process calibrator configured to perform at least two functions and to calibrate an instrument, the process calibrator comprising:
a memory, a processor, and a display that is arranged to show a user interface; and
at least two connection arrangements that are assigned to different functions of the at least two functions of the process calibrator;
wherein the at least two connection arrangements are physical connections in physical locations and wherein the at least two connection arrangements are substantially on the same side of the process calibrator as the display;
wherein the user interface is configured to show in the display the different functions of the at least two functions of the process calibrator, which can be selected;
wherein in connection with a particular function of the at least two functions being selected, the user interface is configured to show a visual presentation, where a place on the user interface corresponding to a particular connection arrangement of the at least two connection arrangements that is assigned to the particular function selected is highlighted compared to places on the user interface corresponding to other connection arrangements; and
wherein the places on the user interface corresponding to the at least two connection arrangements are proportional to the physical locations of the at least two connection arrangements on the process calibrator.

2. The process calibrator according to claim 1, wherein the display is a touch screen.

3. The process calibrator according to claim 1, wherein a connection instruction corresponding to the particular connection arrangement is shown on the user interface.

4. The process calibrator according to claim 3, wherein at least part of the particular connection arrangement comprises two connection points and the connection instruction indicates the connection thereof.

5. The process calibrator according to claim 4, wherein one of the two connecting points is a ground connection.

6. The process calibrator according to claim 1, wherein at least a part of the at least two functions comprise subfunctions that can be selected with the user interface and that realize different alternatives of the at least two functions.

7. The process calibrator according to claim 1, wherein the process calibrator comprises two or more higher operating modes that can be selected with the user interface, wherein each higher operating mode includes one function or more of the at least two functions.

8. The process calibrator according to claim 7, further comprising at least one of: one higher operating mode of the two or more higher operating modes being a fieldbus communicator and a fieldbus communicator being a function of at least one higher operating mode of the two or more higher operating modes.

9. The process calibrator according to claim 1, wherein the process calibrator comprises at least one key for controlling the user interface.

10. The process calibrator according to claim 1, wherein the process calibrator is configured to perform simultaneously two or more functions of the at least two functions, and wherein the display is configured to show the places on the user interface corresponding to the at least two connection arrangements corresponding to the two or more functions.

11. A method for controlling of the use of a process calibrator configured to perform at least two functions and to calibrate an instrument, wherein the process calibrator comprises a memory, a processor, a display that is arranged to show a user interface, and at least two connection arrangements that are assigned to different functions of the at least two functions of the process calibrator, wherein the at least two connection arrangements are physical connections in physical locations and wherein the at least two connection arrangements are substantially on the same side of the process calibrator as the display, the method comprising:
 showing in the user interface of the display different functions of the at least two functions of the process calibrator that can be selected; and
 visually highlighting, in connection with a particular function being selected from the different functions of the at least two functions shown on the user interface, a place on the user interface corresponding to a particular connection arrangement of the at least two connection arrangements assigned to the particular function selected as compared to places of the user interface corresponding to other connection arrangements of the at least two connection arrangements;
 whereby the places on the user interface corresponding to the at least two connection arrangements are proportional to the physical locations of the at least two connection arrangements on the process calibrator.

12. The method according to claim 11, wherein the display is a touch screen.

13. The method according to claim 11, wherein the user interface shows a connection instruction corresponding to the particular connection arrangement.

14. The method according to claim 13, wherein at least a part of the particular connection arrangement comprise two connection points and the connection instruction includes an indication of how the two connection points are to be connected.

15. The method according to claim 14, wherein the indication is shown visually.

16. The method according to claim 11, wherein at least a part of the at least two functions comprise subfunctions that can be selected with the user interface and that realize different alternatives of the at least two functions.

17. The method according to claim 11, wherein the process calibrator comprises two or more higher operating modes that are selectable with the user interface, wherein each higher operating mode of the two or more higher operating modes includes one function or more of the at least two functions.

18. The method according to claim 11, wherein the process calibrator is configured to perform simultaneously two or more functions of the at least two functions, and wherein the display shows the places on the user interface corresponding to the at least two connection arrangements corresponding to the two or more functions.

19. A user interface configured to control a process calibrator that is configured to perform at least two functions and to calibrate an instrument, the process calibrator comprising a memory, a processor, a display that is arranged to show a user interface, and at least two functions and at least two connection arrangements that are assigned to different functions of the at least two functions of the process calibrator, wherein the at least two connection arrangements are physical connections in physical locations and wherein the at least two connection arrangements are substantially on the same side of the process calibrator as the display, wherein the user interface is configured to be saved in the memory as computer software that is run by the processor, wherein the user interface is configured to show in the display the different functions of the at least two functions of the process calibrator, which can be selected, wherein in connection with a particular function of the at least two functions being selected, the user interface is configured to show a place on the user interface corresponding to a particular connection arrangement of the at least two connection arrangements that is assigned to the particular function; visually highlighted compared to other places on the user interface corresponding to other connection arrangements, whereby the places on the user interface corresponding to the at least two connection arrangements are proportional to the physical locations of the at least two connection arrangements on the process calibrator.

20. The user interface according to claim 19, wherein the display is a touch screen.

* * * * *

UNITED STATES PATENT AND TRADEMARK OFFICE
CERTIFICATE OF CORRECTION

PATENT NO. : 9,863,795 B2  
APPLICATION NO. : 14/375611  
DATED : January 9, 2018  
INVENTOR(S) : Kari Autio, Heikki Laurila and Marko Stenbacka Page 1 of 1

It is certified that error appears in the above-identified patent and that said Letters Patent is hereby corrected as shown below:

In the Claims

Claim 19, Column 12, Line 43, delete the ";" between "function" and "visually".

Signed and Sealed this  
Twenty-second Day of May, 2018

Andrei Iancu  
*Director of the United States Patent and Trademark Office*